United States Patent Office 2,790,267
Patented Apr. 30, 1957

2,790,267

CONTROL OF TRASH FISH

William M. Lee, Ambler, Pa., assignor to The Pennsylvania Salt Manufacturing Company, Philadelphia, Pa., a corporation of Pennsylvania No Drawing. Application January 30, 1956,
Serial No. 562,008

10 Claims. (Cl. 43—124)

This invention is directed to the methods for the control of trash fish by the application of toxic amounts of O-alkyl-S-pentachlorophenyl thiolcarbonates. An O-alkyl-S-pentachlorophenyl thiolcarbonate has the structure:

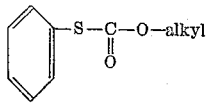

It frequently happens that unwanted fish invade a lake or stream and multiply so rapidly that other desired fish are unable to feed or to propagate properly. The infestation of the unwanted or trash fish may reduce the desired fish to the point that for commercial or sport purposes the fish may be said to be non-existent. For example, Diamond Lake in Oregon became so infested with roach fish that the rainbow trout population in the lake practically disappeared. The roach fish multiplied so rapidly that the supply of fish food dwindled to the point where the rainbow trout could not obtain sufficient food to grow to full size or to propagate. The lake was restored by killing the entire fish population with rotenone, a natural product, after which the lake was restocked with trout fingerlings. Rotenone as used for this purpose has the disadvantage of being a natural product and as such varies considerably in concentration and biocidal activity. Rotenone in a dust form is also very irritating to workers who must handle the powder. Moreover, when millions of gallons of water are being treated, the amount of rotenone required together with its high unit cost makes the operation a very expensive one.

I have now discovered new methods and compositions for the effective control and treatment of part or whole fish populations. The active ingredient employed has excellent toxic qualities in regard to the many varieties of fish encountered in lakes, streams and ponds. An outstanding feature in the application of these materials is that most species of fish are killed in less than twenty-four hours at concentrations as low as 5 to 20 parts per million of the active ingredient, an O-alkyl-S-pentachlorophenyl thiolcarbonate and in some instances below five parts per million. High toxicity to most fish species at 5 to 10 parts per million is most unusual when it is considered that many organic chemicals have a toxic effect on fish only at concentrations of from 20 to 30,000 parts per million. See "Appraisal of a Chemical Waste Problem by Fish Toxicity Tests," Gillette et al., "In Sewage and Industrial Waste," page 1397, November 1952. Other advantages in my methods and compositions lie in the fact that the material is of uniform toxicity and that liquid and dust formulations are non-irritating to users.

In one embodiment of my invention, a suitable formulation, as hereinafter described, of an O-alkyl-S-pentachlorophenyl thiolcarbonate is applied in a desired concentration, usually 5 or more parts per million, to a pond or lake in which it is desired to eliminate the entire fish population preparatory to restocking with a desired fish. In other applications, certain species of fish may be selectively killed, leaving other desired species alive, by employing a lower concentration of toxicant, for example 5 or less parts per million.

In another embodiment of my invention, the fingerlings or small fish in a pond or lake are killed leaving the adult fish unaffected by the toxic concentration employed. By restocking the pond or lake with the desired fish species several weeks after the toxic treatment, that is, at a time when the toxic material is dissipated, a large ratio of desired fish to unwanted fish is quickly obtained.

The advantage of this method of adjusting fish populations resides in the fact that much lower concentrations of chemicals are required than when the entire population is killed, and hence the cost of treatment is considerably reduced. This method has the additional advantage that the disposal of large quantities of poisoned dead fish is avoided.

Trash fish as used in this specification define unwanted fish. The term includes predatory fish, worthless fish, and fish species which although they are normally desirable, are unwanted in the particular location at that time.

The O-alkyl-S-pentachlorophenyl thiolcarbonates are the active ingredients employed in my new methods. Alkyl substituents containing not in excess of four carbon atoms have been particularly useful in practicing my invention. More specifically, the alkyl substituent can be methyl, ethyl, propyl, iso-propyl, n-butyl and iso-butyl. The active ingredients of my invention can be prepared in the following manner.

EXAMPLE 1

*Preparation of O-ethyl-S-pentachlorophenyl thiolcarbonate*

A 2-liter, three necked flask was fitted with a thermometer well, stirrer and dropping funnel. A water bath enclosed the lower one-half of the flask to provide heat or cooling. 20.5 grams (0.5 moles) of sodium hydroxide (97.4% NaOH) was dissolved in 1200 cc. of water, placed in the 2-liter flask and cooled to 15° C. 141.2 grams (0.5 mole) of pentachlorothiophenol was added with stirring until it completely dissolved in the sodium hydroxide solution. 59.7 grams (0.55 mole) of ethyl chloroformate was added to the solution at a temperature of 17°, while stirring, over a 45 minute period during which time a white precipitate formed. After all the chloroformate was added, stirring was continued for an additional one hour while the temperature was maintained between 15 and 20° C. The reaction mixture was filtered on paper in a Buchner funnel and washed several times with cold water. The product was placed on paper and allowed to air dry for several days. After drying the product weighed 184 grams (quantitative yield) and had a melting range of 88 to 103° C.

The crude product was recrystallized from hot methyl alcohol to yield 107 grams of O-ethyl-S-pentachlorophenyl thiolcarbonate having a melting range of 85 to 88° C. Chlorine and sulfur determinations of the recrystallized product were as follows:

|  | Found | Theory |
|---|---|---|
| Chlorine (percent) | 49.7 | 50.00 |
| Sulfur (percent) | 9.19 | 9.02 |

Using the same procedure as described above, methylpentachlorophenyl thiolcarbonate, propylpentachlorophenyl thiolcarbonate, isopropylpentachlorophenyl thiolcarbonate and n-butylpentachlorophenyl thiolcarbonate and isobutylpentachlorophenyl thiolcarbonate can be prepared by reacting pentachlorothiophenol with methylchloroformate, propylchloroformate, isopropylchloroformate, n-butylchloroformate and isobutylchloroformate respectively; or by reacting pentachlorothiophenol with the respective bromoformates instead of the chloroformates mentioned above.

The toxicity of the active ingredients used in my methods of controlling trash fish populations was tested by placing small fish fingerlings in large glass tanks of water provided with suitable aeration to maintain the oxygen content. A water temperature normal to the fish species employed was usually maintained around 55 to 65° F.

The active ingredient was dissolved in acetone and dispersed in the glass tanks in the presence of the fish species. The effect of various concentration levels on the fish specimens was observed for a 24 hour period.

EXAMPLE 2

Two fingerlings each of Eastern trout, blue gill sunfish and goldfish were exposed to O-ethyl-S-pentachlorophenyl thiolcarbonate by adding the active material in acetone solution to the water in the test tanks at a concentration of 5 parts per million of the active ingredient. Continuous observations were made for the first eight hours and then a final observation was made at 24 hours.

After 1½ hours the trout fingerlings were noticeably sick and distressed but did not die in the 24 hour period. At 3½ hours all of the blue gills had died. The goldfish did not appear to be affected at the end of the 24 hour period.

EXAMPLE 3

Further toxicity tests were made on goldfish of smaller size than those used in the preceding experiment. Observations were continuous for the first four hours, renewed at the 19th hour, and a final observation made at the 24th hour. O-ethyl-S-pentachlorophenyl thiolcarbonate was added to the water in the glass tanks as an acetone solution. Various concentrations were tested using five specimens at each concentration.

| Conc. of Active Ingredient (p. p. m.) | Toxicity (Number of Dead Fish) |
|---|---|
| 0 | no deaths. |
| 5 | 2 at less than 19 hrs., 1 at 23 hrs., 2 survived. |
| 10 | 1 at 3.5 hrs., 3 at less than 19 hrs., 1 survived. |
| 20 | 1 at 3 hrs., 3 at 3.5 hrs., 1 at 4 hrs., 0 survived. |

The toxicity to gold fish at concentrations less than 5 parts per million was observed using the same procedure as above. Since lower concentrations were being tested, gentle agitation of the water upon the addition of the active ingredient was employed to secure better dispersion of the active ingredient.

| Conc. of Active Ingredient (p. p. m.) | Toxicity (Number of Dead Fish) |
|---|---|
| 0 | no deaths. |
| 1.25 | 1 at less than 19 hrs., 4 survived. |
| 2.5 | 1 at 2.5 hrs., 1 at less than 19 hrs., 3 survived. |
| 5 | 1 at 2.5 hrs., 4 at less than 19 hrs., 0 survived. |

Employing concentrations as described in the above examples, complete or partial kill as shown in the examples may be obtained of the following trash fish: roach, carp, sucker, goldfish, sunfish and other species.

Employing the same procedures described in the preceding examples, similar results may be obtained with O-methyl-S-pentachlorophenyl thiolcarbonate, O-propyl-S-pentachlorophenyl thiolcarbonate, O-isopropyl-S-pentachlorophenyl thiolcarbonate and O-n-butyl-S-pentachlorophenyl thiolcarbonate and O-isobutyl-S-pentachlorophenyl thiolcarbonate.

There are many factors which can influence the toxicity of a given chemical to fish so that a toxic concentration level established under laboratory testing conditions may be high or low under actual field use. Many factors such as the nature of the stream bottom, the amount of suspended solids in the stream or pond which can absorb the active ingredient, the size of the fish being treated and the tolerance of the particular species of fish all affect the toxicity concentration level.

Emulsion concentrates are very valuable in applying the active ingredients in my new methods to streams since it is easier to meter small quantities of liquids than it is to continuously add solids to moving streams. Emulsion concentrates may be formulated to give a slow settling of the active ingredient or a quick settling, whichever type is preferred for the particular application at hand. In treating the larvae of certain fish which move in, about or near the gravel beds of the streams or ponds it is advantageous to have an emulsion which settles to the bottom rather than one which allows the emulsified material to coalesce and rise to the surface of the water. Sinking emulsions or floating emulsions are obtained by proper choice of ingredients so that the density of the emulsified materials is just slightly greater or less than that of water.

EXAMPLE 4

A slow settling emulsion concentrate is prepared by dissolving 100 parts of O-ethyl-S-pentachlorophenyl thiolcarbonate in 120 parts of xylene. After solution 30 parts of a non-ionic polyether alcohol emulsifier (Triton X–155) is added with agitation. When this material was added to a body of water at a concentration 10 parts per million active ingredient, slow settling and good emulsification was observed.

EXAMPLE 5

A quick settling emulsion concentrate is prepared by dissolving 50 parts of O-ethyl-S-pentachlorophenyl thiolcarbonate in 130 parts of methylated naphthalene solvent (Velsicol AR 60). After solution of the above, 20 parts of polyoxyethylene sorbitol esters of mixed fatty acids (Atlox G–1276) was added with rapid agitation. This formulation when applied to a quiet pond at 5 parts per million active ingredient gave good emulsification with quick settling. When the above concentrate was added to a slowly moving stream at the same concentration, good emulsification and good dispersion with slower settling was observed.

EXAMPLE 6

An extremely slow settling emulsion in water is obtained when 55 parts of the material in Example 5 is added to 34 parts of refined kerosene. Emulsification in water at 25 parts per million of the active ingredient gave excellent performance especially when assisted by slight movement of the stream. The emulsified material settled very slowly with fine dispersion over a period of 12 hours.

Where wettable powders are preferred in the application of my methods to streams, ponds or lakes, these may be prepared by adsorbing the active ingredient on a colloidal clay and then treating it with suitable wetting or dispersing agents so that when they are dusted onto the surface of water, they will penetrate the interface and disperse uniformly. Control of the particle size of the inert solid will determine the rate at which the materials will sink through the water. Thus, fine powders can be employed which will allow suspension in water of the compositions for many hours.

EXAMPLE 7

200 parts of O-ethyl-S-pentachlorophenyl thiolcarbonate were thoroughly mixed with 20 parts of alkyl aryl sulfonate (Kreelon 4C) and 30 parts of polyoxyethylene thioether (Sterox SK). The above liquid was then blended with 750 parts of talc of 200 mesh. This free-flowing powder was sprinkled on water and showed slow settling in quiet waters. In waters with a slow movement suspension of the material for several hours was noted.

EXAMPLE 8

A suitable wettable powder can also be prepared by intimately mixing 350 parts of O-n-butyl-S-pentachlorophenyl thiolcarbonate with 30 parts of polyethylene glycol alkylphenylether (Nonic 300) and 20 parts of sodium lignin sulfonate (Marsperse N). The above liquid mixture was blended with 600 parts of finely-ground pyrophyllite of approximately 200 mesh. The addition of this material to water gives a good suspension with slow settling characteristics.

It will be obvious to those skilled in the art that many modifications may be made within the scope of the present invention without departing from the spirit thereof and the invention includes all such modifications.

I claim:

1. The method of controlling fish populations which comprises adding to the water containing the fish O-alkyl-S-pentachlorophenyl thiolcarbonate, in which the alkyl radical contains not more than four carbon atoms, in concentration and amount toxic to at least some of the fish.

2. The method of eliminating entire fish populations which comprises adding to the water containing the fish a toxic amount of O-alkyl-S-pentachlorophenyl thiolcarbonate in which the alkyl radical contains not more than four carbon atoms.

3. The method of claim 1 in which the alkyl radical is ethyl.

4. The method of claim 1 in which the active ingredient is added to the water in the form of an emulsion concentrate.

5. The method of claim 1 in which the active ingredient is added to the water as a solution.

6. The method of claim 1 in which the active ingredient is added to the water in the form of a wettable powder.

7. The method of claim 2 in which the alkyl radical is ethyl.

8. The method of claim 2 in which the active ingredient is added to the water in the form of an emulsion concentrate.

9. The method of claim 2 in which the active ingredient is added to the water as a solution.

10. The method of claim 2 in which the active ingredient is added to the water in the form of a wettable powder.

No references cited.